Jan. 7, 1930.　　　　　P. S. BANFF　　　　　1,742,945
ELECTRICAL COOKING DEVICE
Filed Oct. 19, 1928　　　2 Sheets-Sheet 1
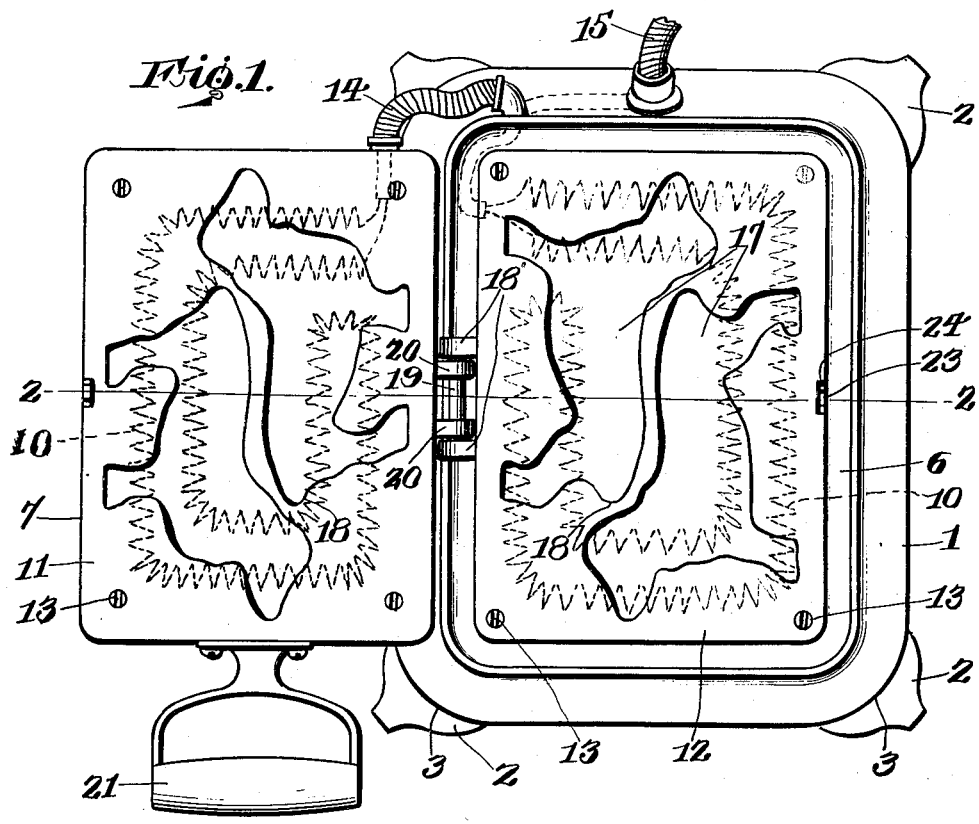
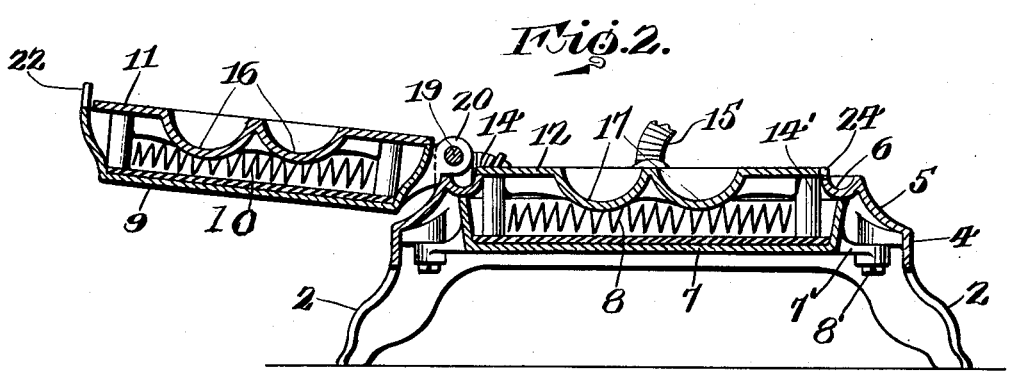
INVENTOR.
Peter Banff,
BY
Geo. F. Kimmel
ATTORNEY.

Jan. 7, 1930. P. S. BANFF 1,742,945
ELECTRICAL COOKING DEVICE
Filed Oct. 19, 1928  2 Sheets-Sheet 2
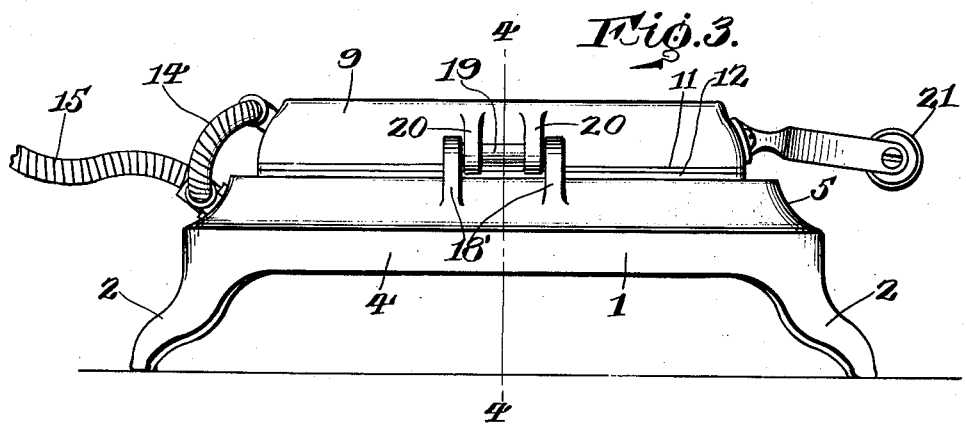
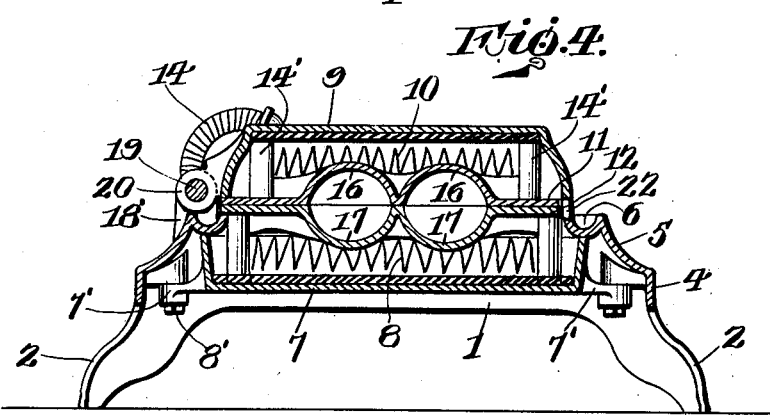
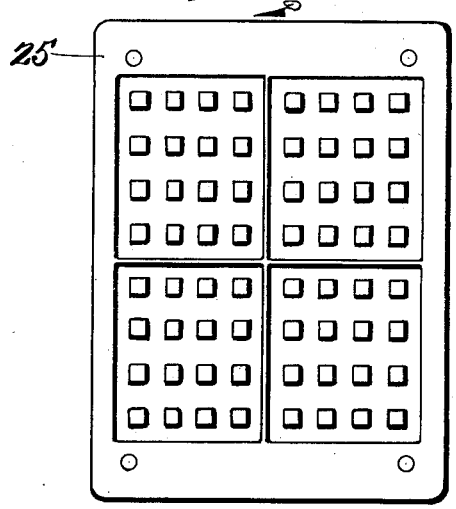
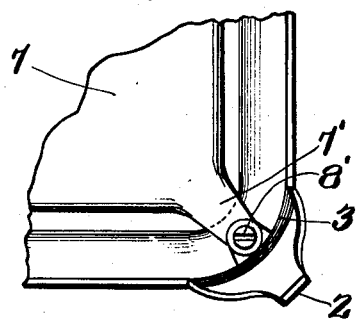
INVENTOR.
Peter Banff,
BY
Geo. P. Kimmel
ATTORNEY.

Patented Jan. 7, 1930

1,742,945

UNITED STATES PATENT OFFICE

PETER S. BANFF, OF CHICAGO, ILLINOIS, ASSIGNOR, BY MESNE ASSIGNMENTS, TO SANITARY FOOD MACHINE CORPORATION, A CORPORATION OF ILLINOIS

ELECTRICAL COOKING DEVICE

Application filed October 19, 1928. Serial No. 313,585.

This invention relates to an electrical cooking device designed primarily for the production of that type of sandwich termed "hot dog", but it is to be understood that a cooking device, in accordance with this invention may be employed for producing any article of food for which it is found applicable, and the invention has for its primary object to provide, in a manner as hereinafter set forth, a device of such class for expeditiously, efficiently, conveniently and satisfactorily producing an article of food simulating the appearance of a dog and formed from sausage of the wiener type embedded in and extending from a body of cooked dough in the form of a roll.

Further objects of the invention are to provide, in a manner as hereinafter set forth, an electrical cooking device for the purpose referred to which is simple in its construction and arrangement, strong, durable, compact, readily portable, thoroughly efficient, and convenient in its use, and comparatively inexpensive to manufacture.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a plan view in open position of the device.

Figure 2 is a section on line 2—2 Figure 1.

Figure 3 is a side elevation of the device in closed position.

Figure 4 is a section on line 4—4 Figure 3.

Figure 5 is fragmentary view in plan.

Figure 6 is a plan view of a modified form of cooking, heating or molding plate.

The device comprises a rectangular stand including a body portion, indicated generally at 1 having depending from each corner thereof an outwardly directed integral leg 2.

The body portion 1 has rounded corners 3 and with the length of the latter co-extensive with the width of the upper ends of legs 2.

The body portion 1, which is in the form of a frame includes a vertical lower part 4, an upstanding, inwardly curved, intermediate part 5 of greater height than part 4 and an inwardly directed, upper part 5 surrounded by the upper portion of part 4. The upper part 5 is of channeled shaped cross section at any point throughout and which provides a collecting groove 6 for the overflow of dough whereby the latter is prevented from running down the outer face of the stand, which otherwise would make the stand unsightly.

Supported within the stand is a rectangular, open top lower casing 7 having an insulation lining on its inner face. The upper part 5 of the body portion 1 of the stand is seated on the top edge of casing 7. An electrical heater 8 of known form is arranged within the casing 7. Projecting from each end of casing 7 is a laterally disposed supporting arm 7' which is fixed to the body portion 1 by holdfast devices 8'.

For normally positioning in superposed relation, with respect to the casing 7 and upper part 5 of the body portion 1 is the hinged or upper section of the device. The said hinged section includes a rectangular upper casing 9 having an open bottom and closed top, sides and ends. Arranged within the casing 9 is an electric heater 10 of known construction.

The open top of casing 7 and open bottom of casing 9 are closed respectively by the cooking, heating or molding plates 11, 12 to be hereinafter referred to. The plates are detachably secured in position by removable holdfast devices 13 extending through the corners of the plates and engaging in sockets formed in pillars 14' integral with the bottom of casing 7 and the top of casing 9. The plate 11 when in position to close casing 7, bears against the inner top edge of the upper part 5 of the body portion of the stand.

The heaters 8 and 10 are permanently electrically connected together as at 14.

Leading to the connection 14, as well as electrically attached thereto is a current conducting means 15 which extends from a source of supply not shown.

As shown the plate 11 is formed with a pair of molding cavities 16 and the plate 12 with a pair of like cavities 17. The cavities 16 are oppositely disposed with respect to each other. The cavities 17 are also oppositely disposed with respect to each other. The cavities 16 are oppositely disposed with respect to the cavities 17. Each cavity in appearance simulates half of a dog. Each cavity has its ends provided with hollow extensions 18 which are oppositely disposed relative to each other and receive the ends of a sausage of the wiener type. The extensions are of less depth than the portions of the cavity which simulates the body of the animal. The molding cavities of the plates coact, when the plates 11, 12 are superposed, to provide a roll with the sausage therein, and further with the ends of the sausage extended from the ends of the roll, under such conditions producing what is termed a hot dog sandwich and with the latter simulating the appearance of a dog.

It is to be understood that in lieu of using the plates 11, 12, other styles of plates can be employed to produce waffles, as well as wheat, corn and buckwheat cakes, etc., for example as indicated at 25, Figure 6.

One side of the body portion 1 of the stand, intermediate the ends of such side has formed integral therewith a pair of spaced lugs 18' carrying a pivot 19, to which is loosely attached a pair of lugs 20 depending from one side of casing 9. This arrangement provides a loose hinge connection between casing 9 and body portion 1 of the stand.

Attached to one end of casing 9 is a handle 21 to facilitate the swinging of the hinged section of the device to and from superposed position with respect to the stand.

To provide for accurately positioning the plates 11, 12 relatively to each other when in superposed relation the casing 9, at that side opposite the side provided with lugs 20 is formed with a depending lug 22 for entering a socket 23 provided in that side of body portion 1 opposite the side formed with the lugs 18. The plates 11, 12 are formed with notches 24, one for passage of lug 22 and the other for registration with socket 23.

It is thought that the many advantages of an electrical cooking device, in accordance with this invention can be readily understood, and although the preferred embodiment thereof is as illustrated and described, yet it is to be understood that changes in the details of construction can be had which will fall within the scope of the invention as claimed.

What I claim is:

1. An electrical cooking device comprising an open bottom upper casing and an open top lower casing, each adapted to contain an electrical heating unit, a molding plate detachably connected to said upper casing for completely closing the bottom thereof, a molding plate detachably connected to said lower casing for partly closing the top thereof, a support for said lower casing and depending from the latter, a laterally extending means at the lower end of the bottom casing, said laterally extending means abutting the inner face of the support, means for securing the laterally extending means to the support whereby the bottom casing is anchored stationary within the support, said support having its top formed with an endless, channel-shaped part seated on the top edge of said lower casing for closing the remaining portion of the top of such casing, and means for hinging the upper casing to said support.

2. An electrical cooking device comprising an open bottom upper casing and an open top lower casing, each adapted to have arranged therein an electrical heating unit, two sets of spaced pillars, each pillar of each set having a socket opening at one end thereof, the pillars of one set having the other ends thereof integral with the inner face of the top of the upper section, the pillars of the other sets having the other ends thereof integral with the inner face of the bottom of the lower section, a molding plate detachably connected to the socketed ends of the pillars carried by the upper casing for closing the bottom of the latter, a molding plate detachably connected to the socketed ends of the pillars carried by the lower casing for partly closing the top thereof, a support surrounding and secured to the lower casing and closing the remaining portion of the top thereof, said support depending from the lower casing, and means for hinging said upper casing to said support.

3. An electrical cooking device comprising an open bottom upper casing and an open top lower casing, each adapted to have mounted therein an electrical heating unit, two sets of spaced pillars, each pillar of each set having a socket opening at one end thereof, the pillars of one set having the other ends thereof integral with the inner face of the top of the upper casing, the pillars of the other set having the outer ends thereof integral with the inner face of the bottom of the lower casing, a molding plate detachably connected to the socketed ends of the pillars carried by the upper casing for closing the bottom of the latter, a molding plate detachably connected to the socketed ends of the pillars carried by the lower casing for partly closing the top of the latter, a support surrounding the lower casing, secured therewith and depending therefrom, said support having its top provided with an inwardly extending portion seated on the top edge of the lower casing for closing the remaining portion of the top of such casing, and means for hinging the upper casing to said support.

4. An electrical cooking device comprising an open bottom upper casing and an open top lower casing, each adapted to contain an electrical heating unit, a molding plate detachably connected to said upper casing for completely closing the bottom thereof, a molding plate detachably connected to said lower casing for partly closing the top thereof, a support for, secured to and surrounding the bottom casing, said support having its top formed with an endless, channel shaped part seated on the top edge of said lower casing for closing the remaining portion of the top of such casing, means for hinging the upper casing to said support, said plates provided with notches, a lug carried by the upper casing, extending through the notch in that plate secured to such casing and adapted to extend through the notch in the other plate for aligning said plates when the casings are arranged in superposed relation, and said channel-shaped part abutting the lower face of the plate carried by the lower casing.

In testimony whereof, I affix my signature hereto.

PETER S. BANFF.